Patented Sept. 2, 1952

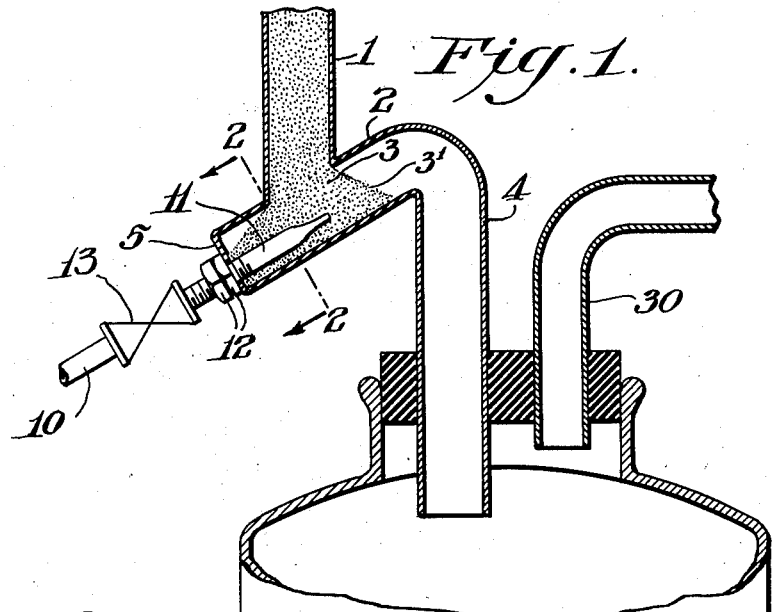
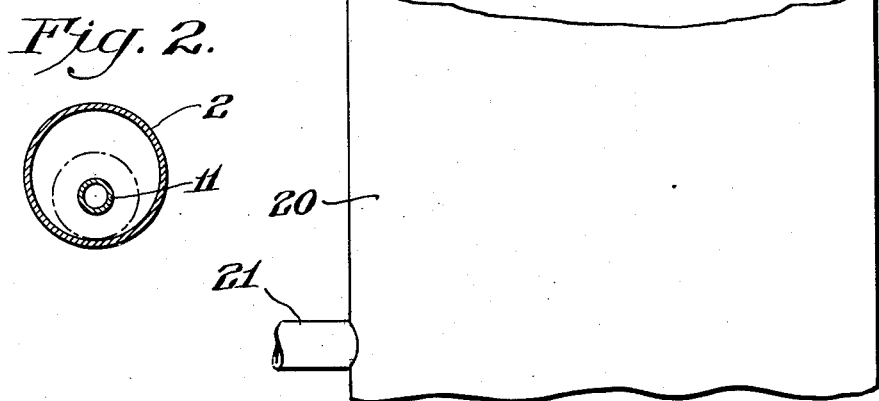
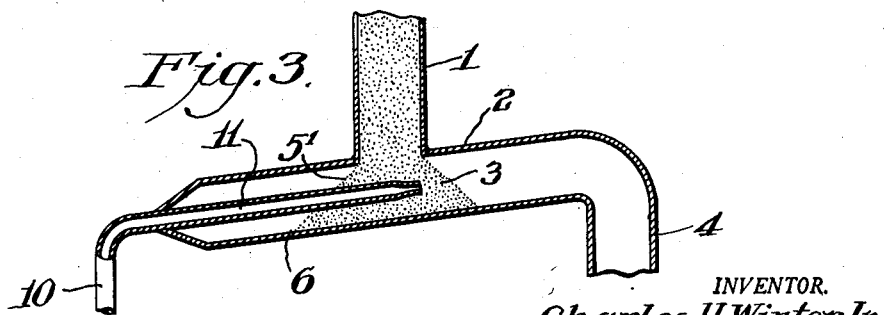

2,609,249

UNITED STATES PATENT OFFICE 2,609,249

NONMECHANICAL SOLIDS VALVE

Charles H. Winter, Jr., Wilmington, Del., assignor to E. I. du Pont de Nemours & Company, Wilmington, Del., a corporation of Delaware Application September 25, 1946, Serial No. 699,194

2 Claims. (Cl. 302—48)

1

This invention relates to means for controlling, stopping and starting the flow of comminuted solids from a storage thereof to a predetermined destination, and especially to such means which is actuated by fluid means, such as air or an inert gas and which is devoid of moving mechanisms.

In many operations the need frequently arises for means to move, or to regulate, or to control the movement of subdivided solids of dust-like fineness from a store thereof into a conduit, reaction chamber or storage chamber. For this purpose, a device which is resistant to deterioration or corrosion is frequently needed.

It is therefore among the objects of the present invention to provide a valve of simple construction for controlling the flow of solid particles. Another object is to provide a valve for such purposes in which there are no moving mechanical parts or elements. A further object of the invention is to provide a valve of such construction that it can be made of materials which resist rapid deterioration from conditions such as high temperatures, abrasion and corrosion. These and other objects of the invention will be apparent from the following description which will be made with reference to the drawings in which Fig. 1 is a sectional elevational view of a valve for controlling the flow of comminuted solids, showing the device mounted on a reaction chamber, the latter being only partially shown, Fig. 2 is a cross sectional view taken along the line 2—2 of Fig. 1, and Fig. 3 is a sectional elevational view of a modified form of valve made in accordance with the invention.

The device comprises in general an upright solids supply conduit 1 which opens at its lower end into a second or transverse conduit 2, the axis of which extends transversely with respect to the axis of the supply conduit. The second conduit comprises a mixing chamber which is coextensive with the space 3 occupied by the comminuted material in normal repose when it is not expanded by adding gas. In the operation of delivering solids to the discharge pipe 4, a gas is delivered to the comminuted material in the mixing chamber in order to expand the material, the expansion being either that in which the material is fluidized and it will flow as a liquid or that in which a cloud is produced and the mixture will flow as a gas. The terminus of the gas supply pipe is located in the mixing chamber. When gas is supplied to the pile of comminuted material in the mixing chamber to the extent that fluidizing

2 takes place, a new talus slope is formed beyond that which existed before expansion took place, the amount of such fluidizing expansion and the new talus slope depending on the relative amount of gas commingled with the comminuted solids. The limit of greatest fluidizing is the point where the solids are in a state of extremely active boiling. Beyond this point of suspension or boiling, a cloud of solids and gas is produced which flows as a gas.

The discharge conduit 4 leads downwardly vertically from the transverse pipe 2. Its entrance is offset along the axis of pipe 2 from the entrance of the supply pipe in the direction of the gas flow. The entrance to the discharge pipe must be located farther away from the supply pipe than the lower limit of the normal talus when gas is not supplied. For the best control of small differences in solids delivered, the entrance to the discharge pipe is preferably located between the latter limiting point and the limit of the talus when the solids are in their maximum fluidized condition. Within these limits, the mixture of solids and gas flows as a liquid. The outlet to the discharge pipe can be beyond these limits, but when thus located the solids can be handled only as clouds. Thus the transverse conduit 2 necessarily comprises the mixing chamber together with connective expansion space between the mixing chamber and discharge port which may be occupied by the mixture of solids and gas.

Referring to Fig. 1, an upright supply pipe or standpipe 1 is connected at its upper end to a storage reservoir (not shown) for comminuted solids such as a dry finely divided metal catalyst of a fineness which will pass a screen of about 80 meshes per inch. The supply of finely divided solids to and through the supply pipe 1 is constant and in a concentrated form of the kind such as a gravity flow which would be produced by connecting an upright supply pipe 1 to the outlet of a hopper. The transverse pipe 2 attached to hte lower end of the supply pipe contains a mixing chamber 3, the leading limit of which constitutes the face or cross sectional area 3' of the comminuted solids when they are in natural repose in the pipe 2. The other limits are defined by the walls of the transverse pipe 2 at the end of the supply pipe 1 and by the slope of natural repose 5' (Fig. 3) or by the wall 5 which may be located at any point so as to cut through the area of 5'. The transverse conduit 2 connects with a discharge conduit 4 which may be attached to or may constitute an integral extension of the nozzle chamber 3. Thus the mixing or nozzle chamber is always defined at its front or discharge end by the surface of the comminuted material when it is in natural repose. The shape and volume of the nozzle chamber may vary with different materials and different finenesses of a given material, depending upon the natural angle of repose of the particular comminuted material being handled.

The back of the nozzle chamber 3 may be limited by the surface of the material in repose as illustrated in Fig. 3, or it may be restricted by a constriction located at any point in the rear of the opening leading from the standpipe, as for example the wall 5 which is formed by constricting or sealing the rear end of tube 2 at a point nearer the upright supply conduit 1 than the area covered by the comminuted material in normal repose. The closure at the back may be located at any desired point either in front of, in the rear of or at the margin of the material in normal repose.

Leading into the nozzle chamber from the rear is a gas supply conduit 10 which may extend backwardly from the supply chamber as illustrated in Figs. 1 and 3. The gas is conducted into a jet pipe 11 which terminates within the mixing or nozzle chamber and is directed forwardly, in general, in a transverse direction with respect to the axis of the standpipe and generally toward the entrance of the discharge pipe. The jet pipe shown in Fig. 1 is capable of being easily regulated for variable capacity by advancing it or withdrawing it along a line parallel to the axis of the chamber. The jet is preferably located so as to direct a current of gas into the mixing chamber toward the discharge opening or conduit and transversely of the axis of the standpipe 1. While the jet pipe may be directed at an angle to the axis of the conduit 2, it is preferably directed parallel thereto along a line intermediate of the axis and the bottom of the nozzle chamber.

The device may be constructed of a great variety of materials, such as the plastic materials, ceramic materials or metals. The form shown in Fig. 3 may be suitably molded in one piece, whereas the form shown in Fig. 1 may be partly fabricated. For example, referring to Fig. 1, the wall 5 at the back of the supply chamber is bored and threaded, and the threaded jet pipe 11 is mounted therein with its inner end positioned at the desired point within the material when the comminuted material is in normal repose in the transverse pipe 2. The jet pipe extends backwardly through the wall 5. Lock nuts 12 are screwed onto the jet pipe against the outer surface of wall 5 for forming a gas tight seal and for adjusting the nozzle backwardly and forwardly. A valve 13 is mounted in the gas pipe 10 for regulating the amount of gas supplied and thus regulating the rate of discharge of solids from the mixing chamber.

In the form shown in Figs. 1 and 2, the jet pipe 11 is preferably mounted parallel with the axis of the nozzle or jet chamber with the jet terminating at a point within the comminuted material, so that a cone of gas, if projected freely, would contact with the lowest point of pipe 2 not materially farther from the jet than the line of contact defined by the natural slope of the material and the wall of pipe 2. It is possible to vary the nozzle somewhat from this position as long as the nozzle is not moved outside of the mixing chamber. The wall of the discharge duct 4 nearest the standpipe is preferably farther from the standpipe than the extreme lower point of the normal talus in the mixing chamber and not farther away than the extreme lower limit of the talus when the material is given its maximum expansion by blowing gas into the pile. Preferably the opening is located just outside of the extreme limit of the normal talus so that a wide variation in the flow of solids with a minimum flow of gas can be maintained whilst allowing an ample discharge opening for receiving the flow of expanded solids when maximum expansion is provided.

Mixture of gas and solids thus produced by the gas issuing from the nozzle flows into the discharge pipe 4 as shown in Fig. 1. The solids may then be showered into a reaction chamber 20 wherein they may encounter a reaction gas introduced through supply pipe 21. The reacted solids may be settled in the reaction vessel 20 and removed by suitable means and the residual gases may be removed through the discharge pipe 30.

From the foregoing disclosure it will be recognized that the invention is susceptible of modification without departing from the spirit and scope thereof and it is to be understood that the invention is not restricted to the specific illustrations thereof herein set forth.

I claim:

1. In a closed system, a non-mechanical, solids control means comprising an upright standpipe of substantially uniform diameter for admitting fluidized, comminuted, solids to the control means, a transverse fluidizing chamber disposed across the lower terminal of the standpipe at an acute angle to the axis of the standpipe and having a portion thereof extending in opposite directions from the supply terminus to provide a back pocket portion and a mixing chamber of substantially equal diameter and capacity, a discharge conduit having an entrance and outlet positioned to lead vertically downward from the transverse pipe and having its entrance located at a greater distance from the supply pipe than the lower limit of the normal talus when fluidizing gas is not supplied and the limit of the talus when the solids are in their maximum fluidized condition, a connective expansion space for the mixture of solids and gas, positioned between the mixing chamber and vertical discharge port, and means for applying a velocity energy and a static pressure energy comprising a jet having its terminus on a line with the wall of the supply pipe nearest to the discharge outlet.

2. The fluidizing system of claim 1 in which the inlet, outlet and intermediate fluidizing chamber are free of obstructions and are substantially uniform in diameter throughout to provide a straight run of the fluidizing material with uniform flow unassisted by any other means.

CHARLES H. WINTER, Jr.

REFERENCES CITED

The following references are of record in the file of this patent:

UNITED STATES PATENTS

| Number | Name | Date |
| --- | --- | --- |
| 691,993 | Watters | Jan. 28, 1902 |
| 1,086,454 | Johnson | Feb. 10, 1914 |
| 1,263,722 | White | Apr. 23, 1918 |
| 1,442,061 | Franz | Jan. 16, 1923 |
| 1,473,757 | Dorsey | Nov. 13, 1923 |
| 1,486,883 | Halliburton | Mar. 18, 1924 |
| 1,550,037 | McGarvey | Aug. 18, 1925 |
| 2,420,388 | Thomas | May 13, 1947 |